(12) United States Patent
Keh et al.

(10) Patent No.: US 9,214,050 B2
(45) Date of Patent: Dec. 15, 2015

(54) BILL COUNTER WITH A DETECTOR

(71) Applicants: Yu-An Keh, Keelung (TW); Te-Ming Tsao, Keelung (TW)

(72) Inventors: Yu-An Keh, Keelung (TW); Te-Ming Tsao, Keelung (TW)

(*) Notice: Subject to any disclaimer, the term of this patent is extended or adjusted under 35 U.S.C. 154(b) by 64 days.

(21) Appl. No.: 14/158,271

(22) Filed: Jan. 17, 2014

(65) Prior Publication Data

US 2015/0138343 A1    May 21, 2015

(30) Foreign Application Priority Data

Nov. 21, 2013    (TW) .............................. 102221758 U

(51) Int. Cl.
| | |
|---|---|
| *G07F 7/04* | (2006.01) |
| *G07D 11/00* | (2006.01) |
| *G07D 7/12* | (2006.01) |
| *G06K 9/20* | (2006.01) |

(52) U.S. Cl.
CPC ............ *G07D 11/0084* (2013.01); *G07D 7/121* (2013.01); *G07D 11/0042* (2013.01); *G06K 9/209* (2013.01); *G07D 7/12* (2013.01); *G07D 7/128* (2013.01); *G07D 2211/00* (2013.01)

(58) Field of Classification Search
CPC ..... G06K 9/00973; G06K 9/209; G07D 7/12; G07D 7/128; G07D 2211/00
USPC ............ 194/206, 207, 350; 235/454; 382/135
See application file for complete search history.

(56) References Cited

U.S. PATENT DOCUMENTS

| | | | | |
|---|---|---|---|---|
| 5,632,367 | A | * | 5/1997 | Bergeron et al. ............. 194/207 |
| 2005/0183928 | A1 | * | 8/2005 | Jones et al. ................... 194/207 |
| 2012/0249780 | A1 | * | 10/2012 | Mirumachi et al. .......... 348/131 |

\* cited by examiner

*Primary Examiner* — Mark Beauchaine
(74) *Attorney, Agent, or Firm* — Ming Chow; Sinorica, LLC

(57) ABSTRACT

A bill counter has two side panels, a bill-in part, a bill-out part, and a detector. The detector has a reflecting board, a lighting element, and an image capturing device. When the bill counter is in use, the lighting element flashes upon the passing of a bill. The reflecting board reflects the flash to uniformly illuminate the bill, and the image capturing device takes images at the same time. Because the image capturing device does not need to be located near the bill, even when the bill is moved slightly by shock, the images taken do not distort greatly, which prevents identification failure. Besides, the image capturing device eliminates the problem of image dragging, such that a mechanism of the bill counter can be simplified and a production cost is reduced.

17 Claims, 8 Drawing Sheets

BILL COUNTER WITH A DETECTOR

CROSS-REFERENCE TO RELATED APPLICATIONS

This application is based upon and claims priority under 35 U.S.C. 119 from Taiwan Patent Application No. 102221758 filed on Nov. 21, 2013, which is hereby specifically incorporated herein by this reference thereto.

BACKGROUND OF THE INVENTION

1. Field of the Invention

The present invention relates to a bill counter with a detector, especially to a bill counter with a detector that can detect counterfeit bill and identify the face value of the bill.

2. Description of the Prior Arts

A conventional bill counter has two side panels, a bill-in part, a detector, a bill-out part, a wheel assembly and a bill-stacking device. The side panels are mounted with an interval between each other. The bill-in part, the detector, the bill-out part, the wheel assembly, and the bill-stacking device are mounted between the side panels. The bill-in part, the detector, and the bill-out part are arranged in sequence from front to rear. The wheel assembly has multiple wheels arranged from front to rear with intervals between the wheels. The bill-stacking device is mounted in the bill-out part, and protrudes upward out of the bill-in part.

When the bill counter is in use, bills to be detected are put on the bill-in part. Then the wheels rotate to push the bills backward. After the bills pass through the detector and the bill-out part in sequence, the bills are moved to the bill-stacking device and stacked up by the bill-stacking device. When any one of the bills is detected as counterfeit by the detector, the wheels stop rotating after the counterfeit bill is moved to the bill-stacking device, which is convenient for a user to pick up the counterfeit bill from the bill-stacking device.

However, the conventional bill counter has the following shortcomings.

First, the conventional detector has a contact image sensor (CIS), which takes image by multi-point scan to identify the face value of the bill and to detect that the bill is genuine or counterfeit. However, the CIS has to be located close to the bill in order to can take image from the bill. Thus, if the bill counter is shocked while the CIS is scanning, even if the bill is only moved slightly by shock, the image taken by the CIS still alters greatly because the CIS and the bill are too close, causing image distortion. Therefore, the user should keep the conventional bill counter from shock to the best possible extent when the bill counter is in use, otherwise the identification by the detector may fail.

Second, the CIS is linear-scanning, such that the processing speed of the bill and the frequency of the scanning should be matched up accurately, so as to prevent the image from being dragged as well as image distortion. Therefore, the mechanism of the conventional bill counter requires high precision, which makes the manufacture cost high.

To overcome the shortcomings, the present invention provides a bill counter with a detector to mitigate or obviate the aforementioned problems.

SUMMARY OF THE INVENTION

The main objective of the present invention is to provide a bill counter with a detector that can detect counterfeit bill and identify the face value of the bill.

The bill counter has two side panels, a bill-in part, a bill-out part, a detector, a wheel assembly, and at least one bill-stacking device. The bill-in part, the bill-out part, the detector, the wheel assembly, and the at least one bill-stacking device are mounted between the side panels. The detector is mounted between the bill-in part and the bill-out part, and has a circuit board, at least one reflecting board, a transparent board, at least one lighting element, an image capturing device, and a sensor device. The at least one reflecting board is mounted on a top surface of the circuit board, and each one of the at least one reflecting board has an inner surface being reflective. The at least one lighting element is electrically connected to the circuit board. The image capturing device is mounted on the circuit board.

When the bill counter with a detector is in use, the at least one lighting element flashes upon the passing of a bill. The at least one reflecting board reflects the flash to uniformly illuminate the bill, and the image capturing device takes images from the bill at the same time. Because the image capturing device does not need to be located near the bill, even if the bill is moved slightly by shock, the images taken from the bill does not alter greatly, which prevents identification failure by slight shock. Besides, the image capturing device eliminates the problem of image dragging and distortion under shock, such that a mechanism of the bill counter can be simplified. The image capturing device is not as costly as the conventional CIS. Thus, the cost of the bill counter is lowered.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
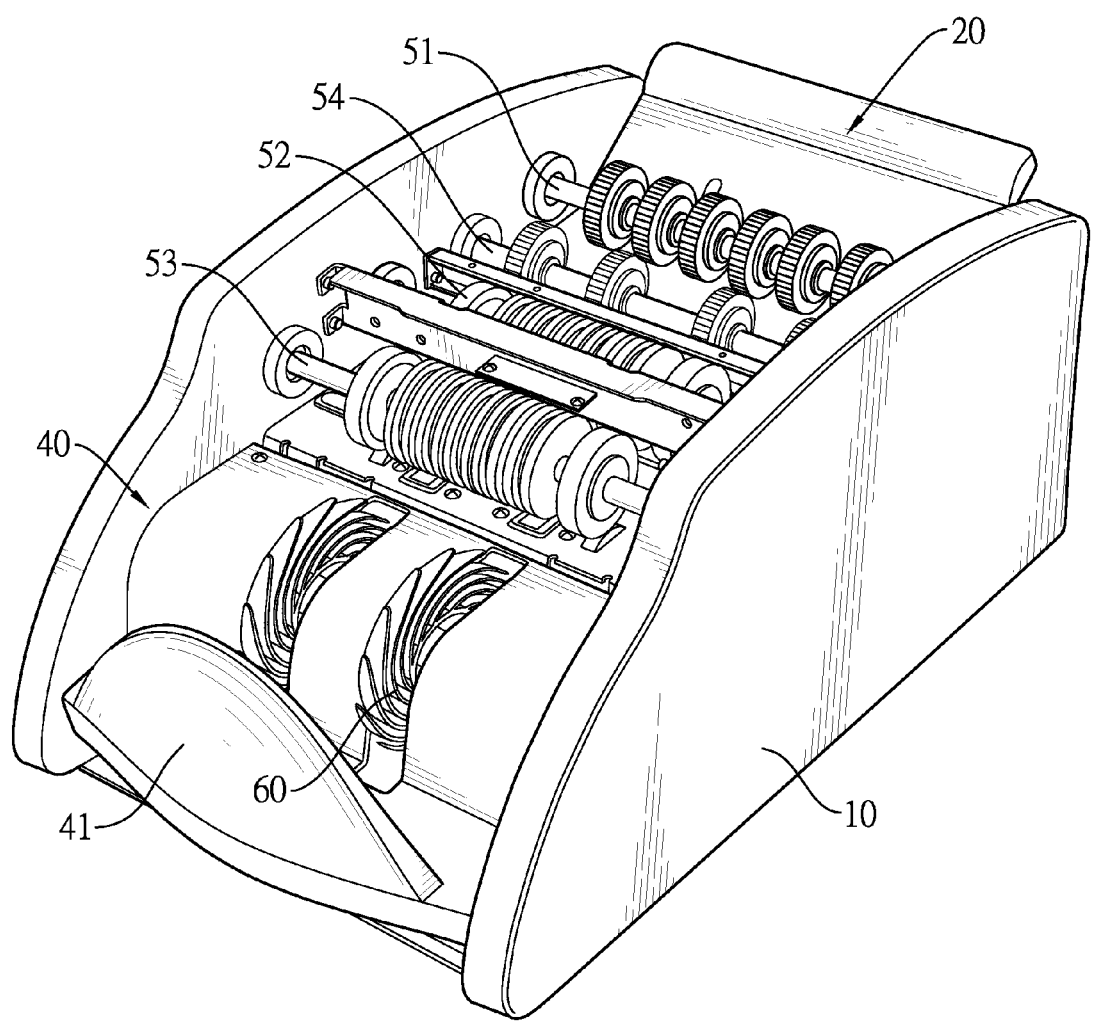
FIG. 1 is a perspective view of a first embodiment of a bill counter with a detector in accordance with the present invention.
Figure 2:
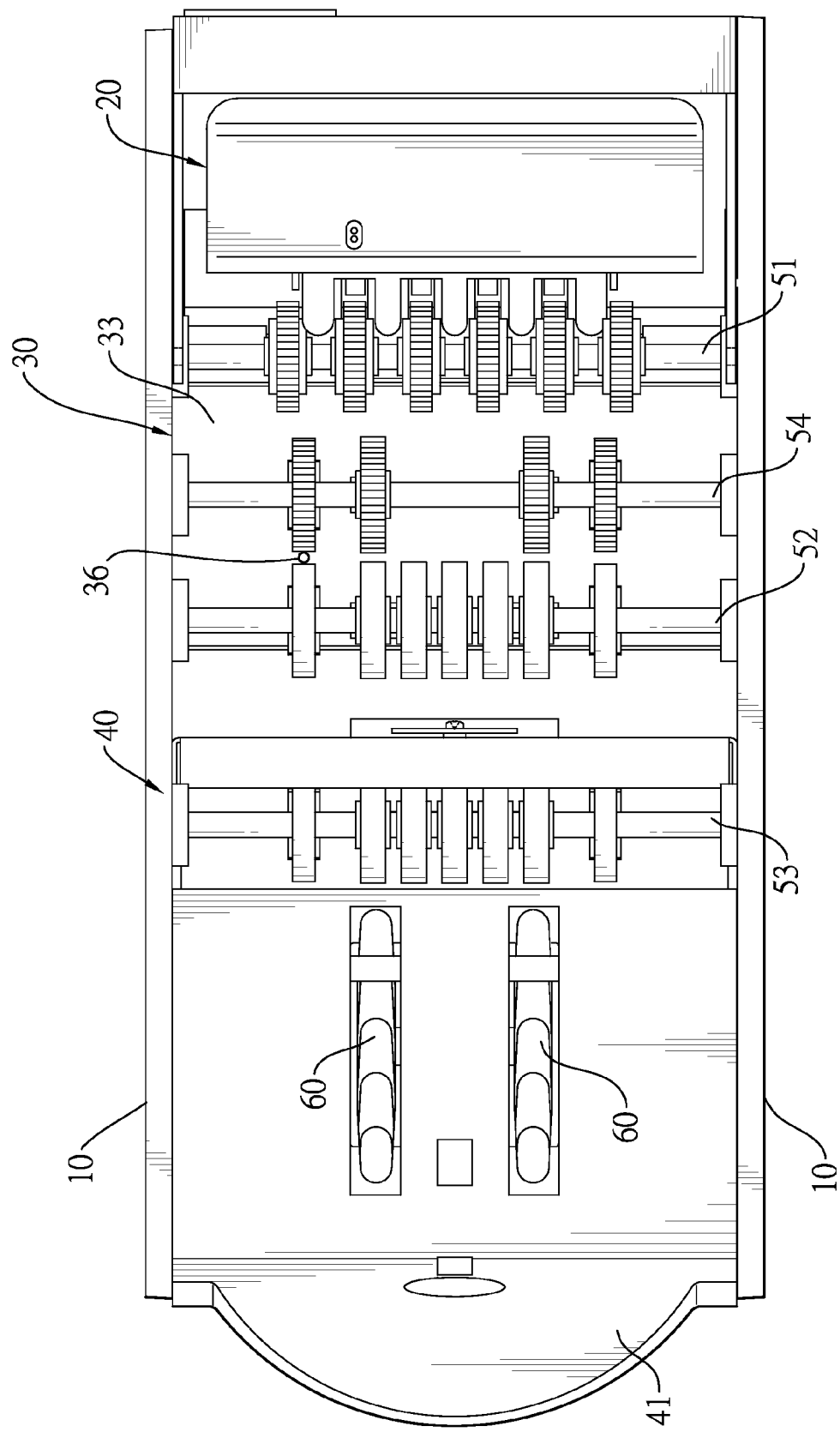
FIG. 2 is a top view of the bill counter with a detector in FIG. 1.
Figure 3:
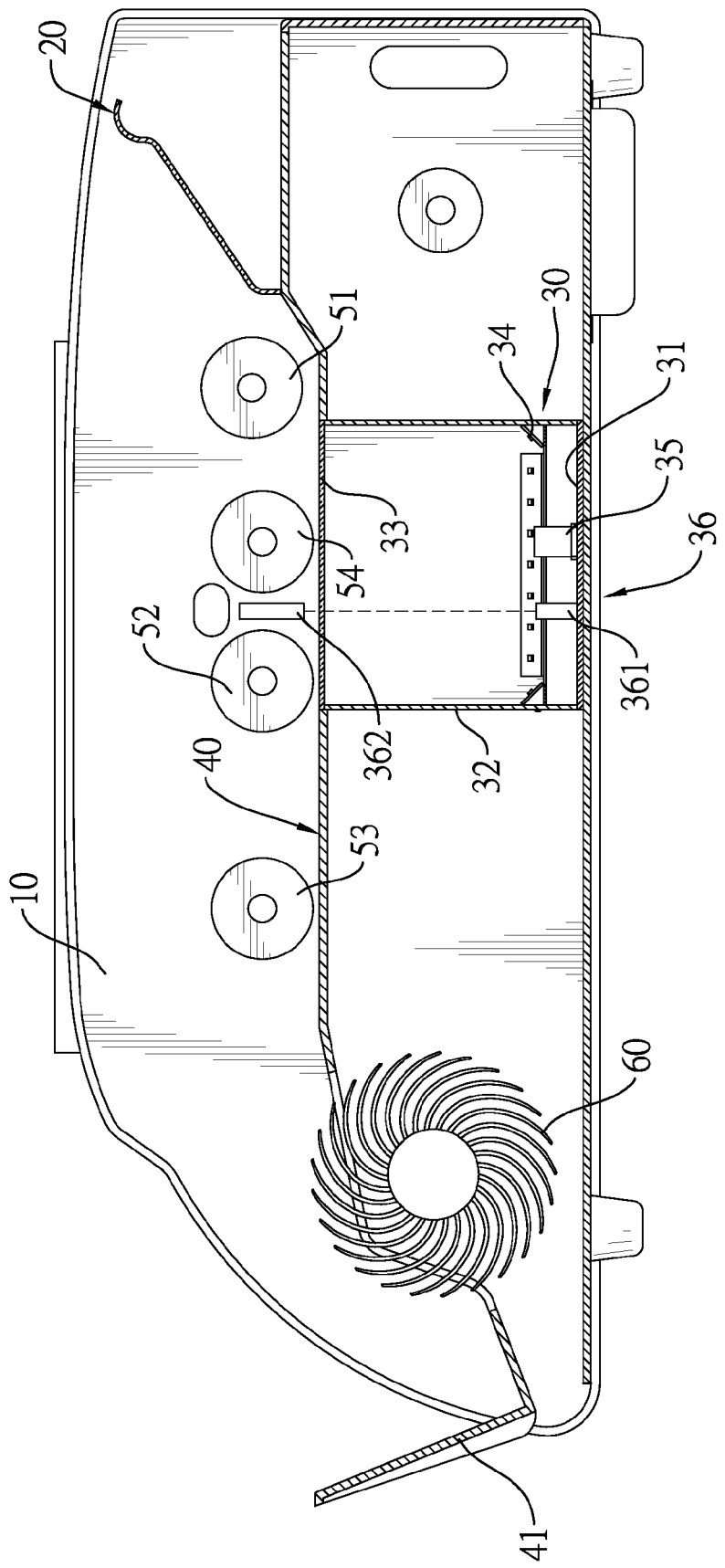
FIG. 3 is a side view in partial section of the bill counter with a detector in FIG. 1.
Figure 4:
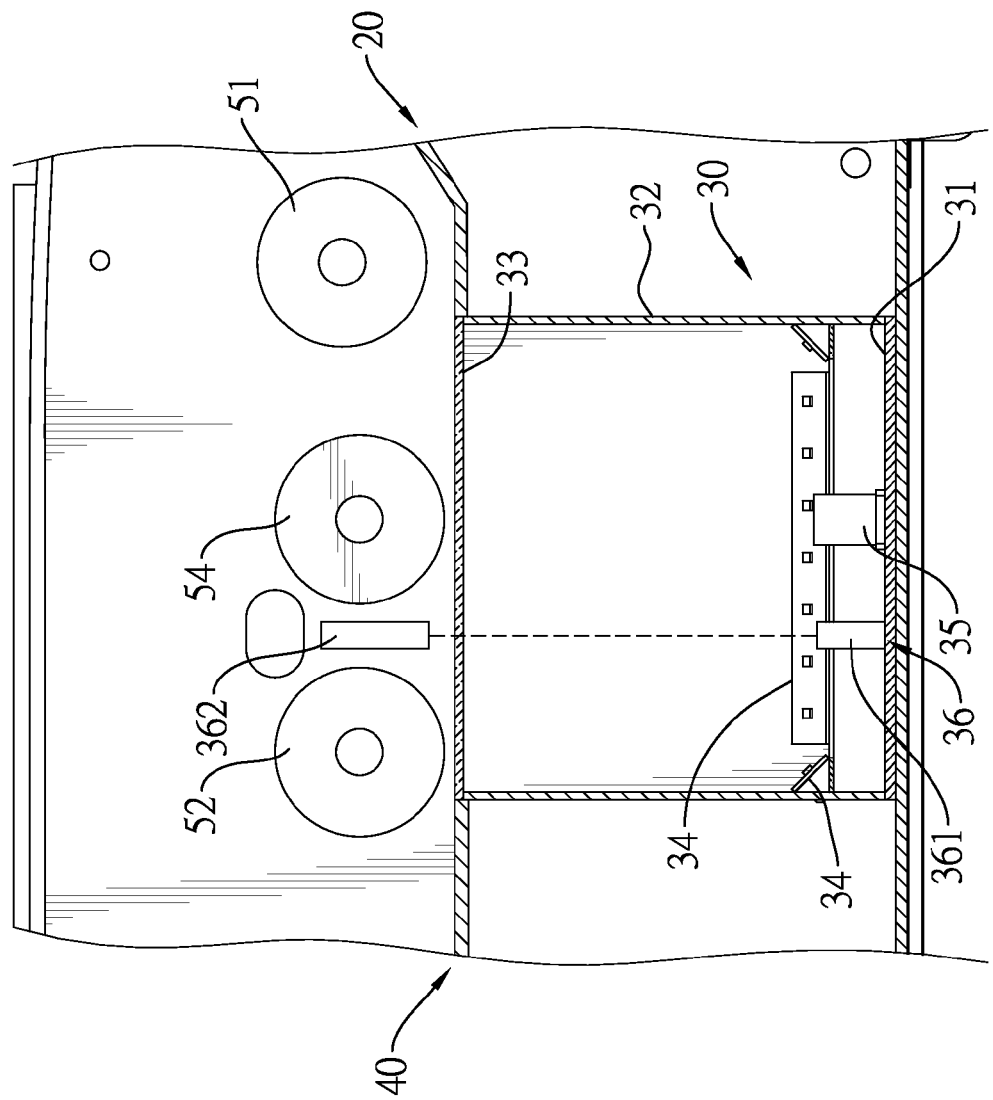
FIG. 4 is another side view in partial section of a detector of the bill counter with a detector in FIG. 1.
Figure 5:
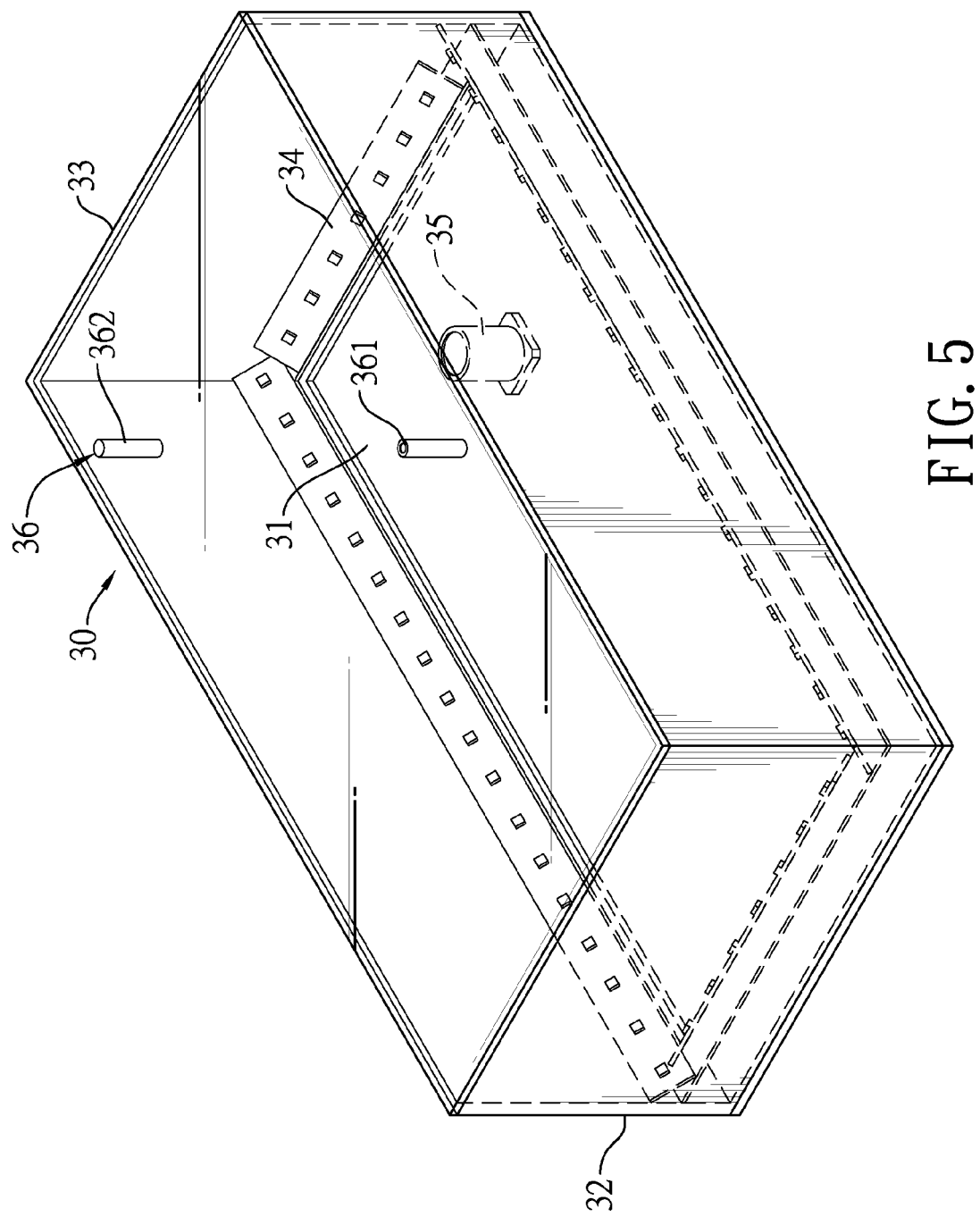
FIG. 5 is a perspective view of the detector of the bill counter with a detector in FIG. 1.

With reference to FIGS. 1 to 3, a bill counter with a detector in accordance with the present invention comprises two side panels 10, a bill-in part 20, a bill-out part 40, a detector 30, a wheel assembly, and at least one bill-stacking device 60. In a preferred embodiment, the bill counter with a detector has two bill-stacking devices 60.

The side panels 10 are mounted with an interval between each other.

The bill-in part 20 is mounted between the side panels 10.

The bill-out part 40 is mounted between the side panels 10. The bill-in part 20 and the bill-out part 40 are each respectively adjacent to two sides of the side panels 10. The bill-out part 40 has a blocking panel 41 mounted on an end of the bill-out part 40.

With reference to FIGS. 2 and 3, the detector 30 is mounted between the side panels 10, is mounted between the bill-in part 20 and the bill-out part 40, and has a circuit board 31, at least one reflecting board 32, a transparent board 33, at least one lighting element 34, an image capturing device 35, and a sensor device 36. In a preferred embodiment, the detector 30 has four reflecting boards 32 and four lighting elements 34.

A top surface of the circuit board 31 is a rough surface and is reflective. In a preferred embodiment, the circuit board 31 is rectangular.

The image capturing device 35 is mounted on the circuit board 31. In a preferred embodiment, the image capturing device 35 has a CMOS (Complementary Metal Oxide Semiconductor) image sensor and a lens.

The reflecting boards 32 are mounted on the top surface of the circuit board 31, are connected to each other into a rectangle, and surround the image capturing device 35. Each reflecting board 32 has an inner surface, and the inner surface is a rough surface and is reflective.

The transparent board 33 is disposed above and covers the reflecting boards 32, and is disposed above the image capturing device 35. The transparent board 33, the reflecting boards 32 and the circuit board 31 are connected to each other to form an enclosed space.

The lighting elements 34 are mounted in the enclosed space, and are electrically connected to the circuit board 31. A bottom side of each lighting element 34 abuts against the top surface of the circuit board 31, a top side of each lighting element 34 abuts against the inner surface of a corresponding one of the reflecting boards 32. Thus, the lighting elements 34 are arranged in a rectangle, and each reflecting element 34 illuminates inclinedly and upwardly toward an inside of the enclosed space and the inner surface of the corresponding reflecting board 32. In a preferred embodiment, each lighting element 34 is an LED string light.

The sensor device 36 is electrically connected to the circuit board 31, and is disposed in back of the image capturing device 35. In a preferred embodiment, the sensor device 36 is an infrared-rays sensor device, and has a first sensor element 361 and a second sensor element 362. The first sensor element 361 is mounted on the circuit board 31. The second sensor element 362 is disposed above the transparent board 33. A position of the first sensor element 361 corresponds to a position of the second sensor element 362. Preferably, the first sensor element 361 is an infrared projector, and the second sensor element 362 is an infrared receiver. When the sensor device 36 is in use, the second sensor element 362 keeps receiving an infrared light from the first sensor element 361. When a bill passes through the sensor device 36, the bill blocks the light receiving of the second sensor device 362, thereby making the sensor device 36 transmit a signal to the circuit board 31. However, a structure of the sensor device 36 is not limited to the embodiment mentioned above.

With reference to FIGS. 1 to 3 and 5, the wheel assembly is mounted between the side panels 10, is disposed above the bill-in part 20, the detector 30, and the bill-out part 40, and includes a first wheel 51, an auxiliary wheel 54, a second wheel 52, and a third wheel 53.

The first wheel 51 is mounted between the side panels 10, and is disposed above a boundary between the bill-in part 20 and the detector 30.

The auxiliary wheel 54 is mounted between the side panels 10, and is disposed above the detector 30.

The second wheel 52 is mounted between the side panels 10, and is disposed above a boundary between the detector 30 and the bill-out part 40. The second sensor element 362 of the sensor device 36 is mounted between the auxiliary wheel 54 and the second wheel 52.

The third wheel 53 is mounted between the side panels 10, is disposed above the bill-out part 40, and is disposed in front of the second wheel 52.

Figure 6:
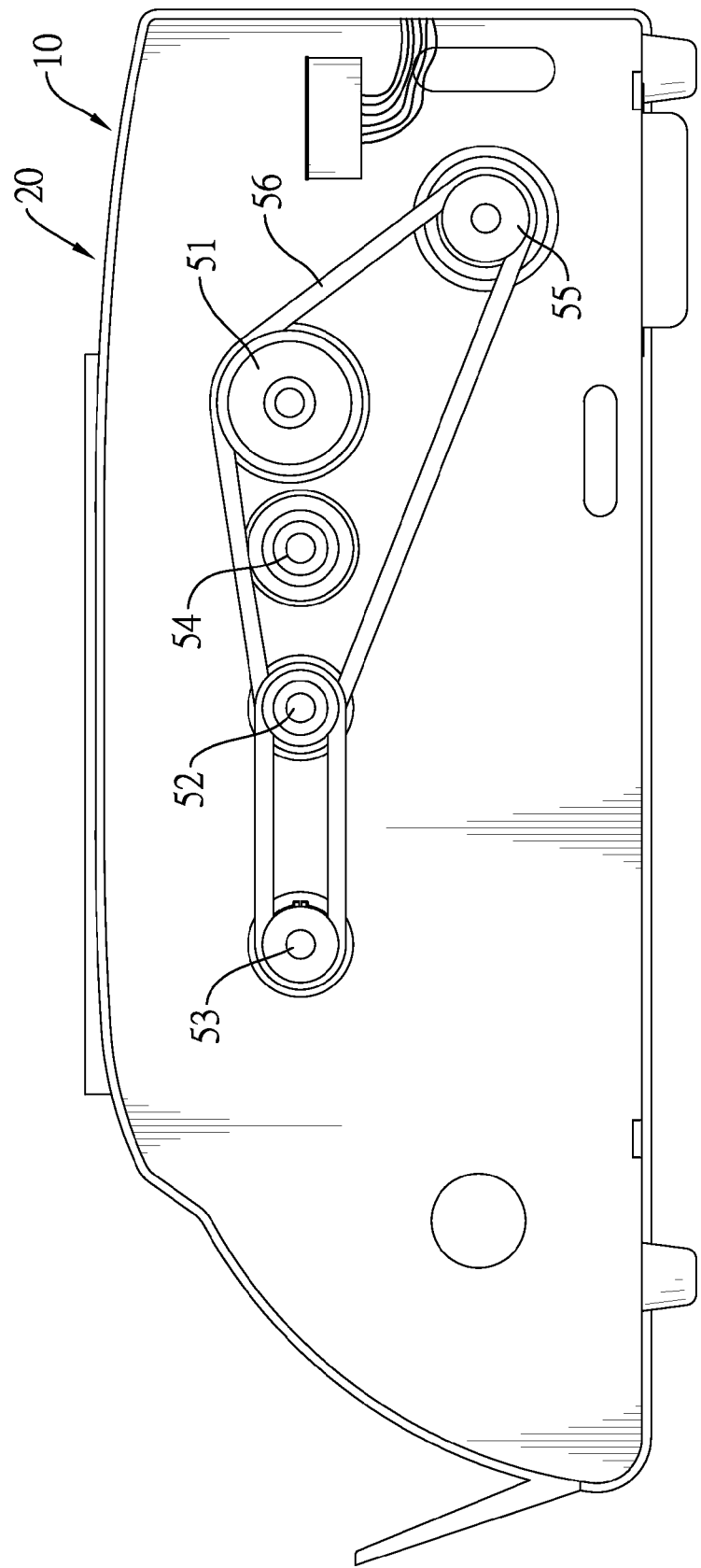
FIG. 6 is an operational view showing rotation of each wheel of the bill counter with a detector in FIG. 1.

In a preferred embodiment, the bill counter with a detector further has a motor 55. The motor 55 is disposed below the bill-in part 20, and drives the first wheel 51, the auxiliary wheel 54, the second wheel 52, and the third wheel 53 via a belt 56, as shown in FIG. 6. However, the driving structure to the wheel assembly is not limited to the embodiment mentioned above.

With reference to FIGS. 1 to 3, the bill-stacking devices 60 are mounted between the side panels 10, are mounted in the bill-out part 40, and protrude upward out of the bill-out part 40. The bill-stacking devices 60 are disposed in front of the third wheel 53, and are mounted with an interval between each other.

With reference to FIGS. 2 to 5, when the bill counter with a detector is in use, bills are put on the bill-in part 20. Then, the bills are moved backward to the bill-stacking devices 60 by the wheels 51, 54, 52, 53 in sequence. Finally, the bills are stacked up on the blocking panel 41 of the bill-out part 40 by the bill-stacking devices 60. During movement of the bills as mentioned above, when the bills are moved to the transparent board 33 of the detector 30, the bills actuate the sensor device 36 between the auxiliary wheel 54 and the second wheel 52. The sensor device 36 transmits a signal to the circuit board 31, and the circuit board 31 actuates the lighting element 34 and the image capturing device 35. After the lighting element 34 is actuated, the lighting element 34 flashes immediately. The transparent board 33, the reflecting boards 32, and the circuit board 31 form the enclosed space, and the top surface of the circuit board 31 and the inner surface of the reflecting board 32 are rough and reflective, such that the flashes from the lighting elements 34, which are inclined and upward toward the inner surface of the reflecting board 32, form a "diffuse reflection", thereby making the flashes uniformly illuminate the bill. At the same time, the image capturing device 35 takes images from the bills, and transmits the images to the circuit board to identify the face value of the bills and to detect that the bills are genuine or counterfeit.

When the image capturing device 35 is taking images from the bill, because the image capturing device 35 does not need to be located near the bill and is mounted on the circuit board 31, which is far from the bill, even if the bill is moved slightly by any force, a distance between the image capturing device 35 and the bill can effectively reduce the alteration of the image taken, which prevents identification failure under slight shock. Besides, a variation of the processing speed of the bill does not cause the image distortion, which further avoids the identification failure. In addition, when the image capturing device 35 is taking images, the "diffuse reflection" below the transparent board 33 also helps maintain stability of the image taking of the image capturing device 35. Finally, the auxiliary wheel 54 above the detector 30 can effectively move the bill on the transparent board 33, thereby preventing the bill from remaining on the transparent board 33 and being overlapped with the next bill.

Figure 7:
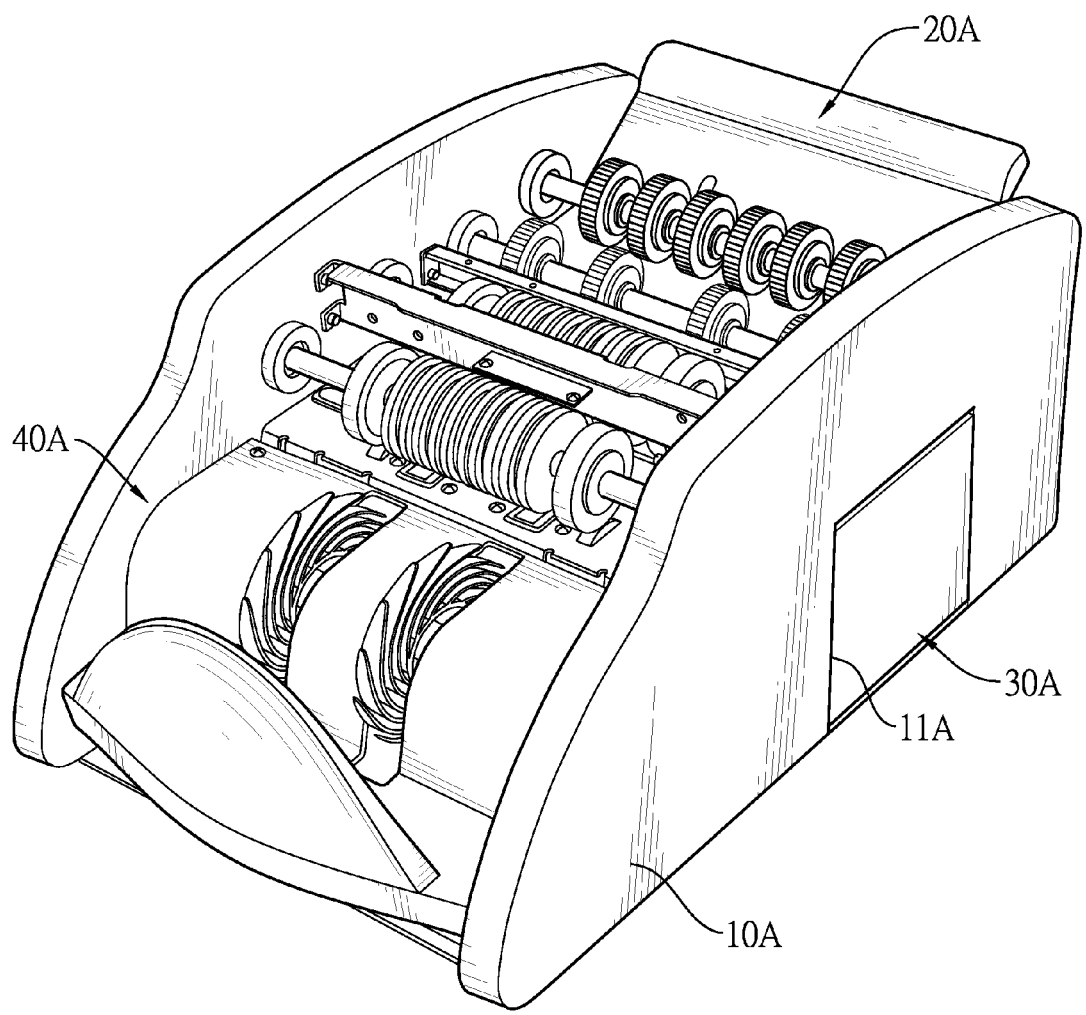
FIG. 7 is a perspective view of a second embodiment of a bill counter with a detector in accordance with the present invention.
Figure 8:
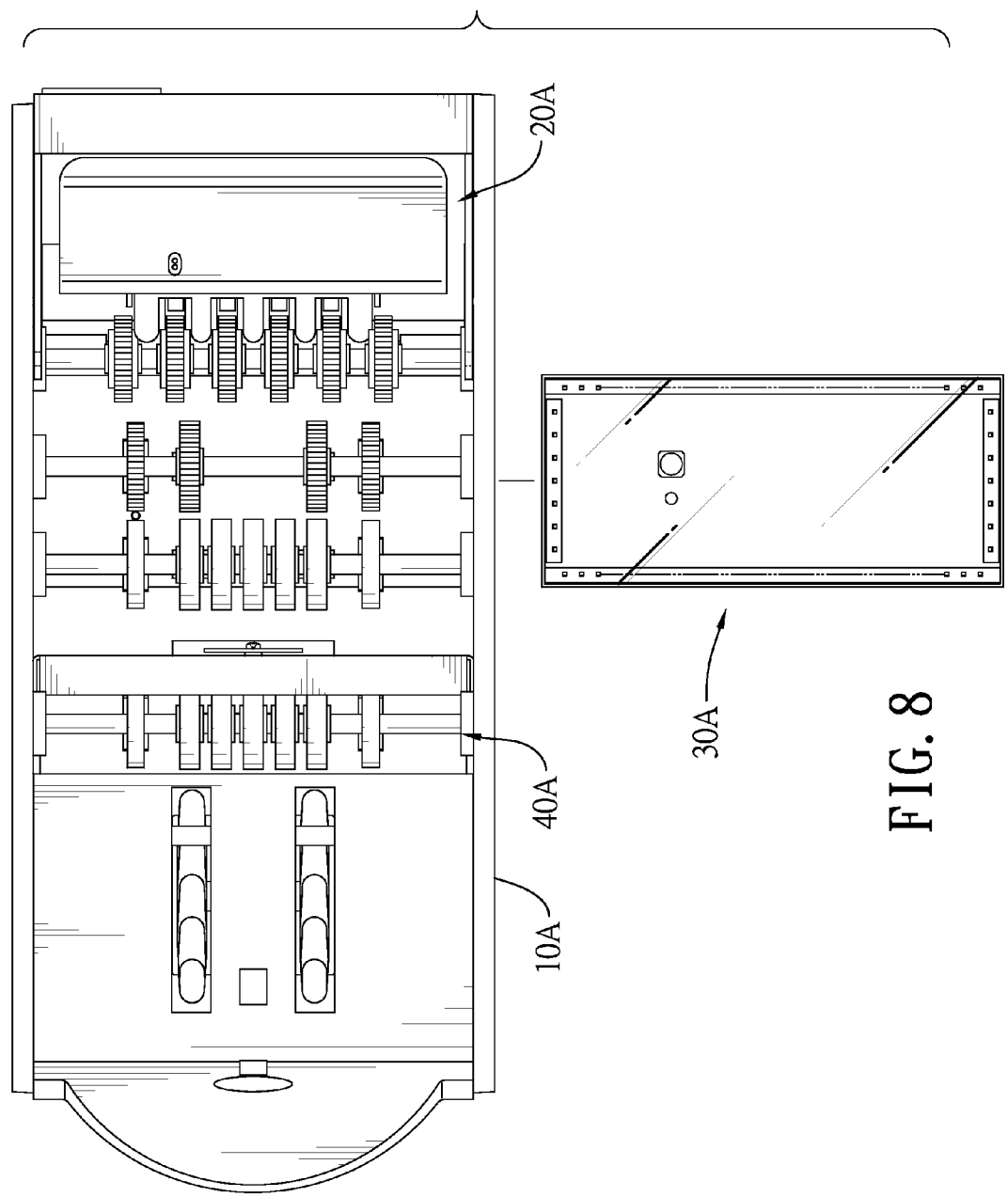
FIG. 8 is an operational view, showing the detector separated from the bill counter in FIG. 7.

With reference to FIGS. 7 and 8, a second embodiment of the present invention is similar to the first embodiment as mentioned above. However, the detector 30A is detachably mounted between the side panels 10A, the bill-in part 20A, and the bill-out part 40A. One of the side panels 10A has a through hole 11A formed through the side panel 10A and corresponding to the detector 30A in shape. The detector 30A is mounted transversely into and between the bill-in part 20A and the bill-out part 40A via the through hole 11A, and then the detector 30A is mounted securely to the side panels 10A, the bill-in part 20A, and/or the bill-out part 40A by screwing.

Thus, the second embodiment can modularize the detector 30A. When the detector 30A of the bill counter is broken, the user only needs to replace the detector 30A instead of the whole bill counter. Accordingly, the manufacturers also can achieve the division of labor, for example, one of the manufacturers manufactures the detector 30A, and another manufacturer purchases the manufactured detector 30A and assembles the detector 30A with other components into a bill counter with a detector.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A bill counter comprising:
   two side panels mounted with an interval between each other;
   a bill-in part mounted between the side panels;
   a bill-out part mounted between the side panels;
   a detector mounted between the side panels, mounted between the bill-in part and the bill-out part, and having
      a circuit board;
      at least one reflecting board mounted on a top surface of the circuit board; each one of the at least one reflecting board having an inner surface being reflective;
      a transparent board disposed above and covering the at least one reflecting board for bills to move on and pass;
      at least one lighting element electrically connected to the circuit board;
      an image capturing device mounted on the circuit board, disposed apart from the transparent board, and being able to capture an image of a bill on the transparent board; and
      a sensor device electrically connected to the circuit board;
   a wheel assembly mounted between the side panels, and disposed above the bill-in part, the detector, and the bill-out part; and
   at least one bill-stacking device mounted between the side panels; a position of the at least one bill-stacking device corresponding to a position of the bill-out part;
   wherein when a bill is moved to the transparent board, the sensor device detects the bill to actuate the at least one lighting element and the image capturing device via the circuit board; when the at least one lighting element is actuated, the at least one lighting element flashes immediately to illuminate the bill directly and via the reflection of the at least one reflecting board, and simultaneously the image capturing device takes images from the bill.

2. The bill counter as claimed in claim 1, wherein in the detector, each one of the at least one lighting element is inclined toward the inner surface of a corresponding one of the at least one reflecting board.

3. The bill counter as claimed in claim 1, wherein in the detector, the inner surface of each one of the at least one reflecting board is a rough surface.

4. The bill counter as claimed in claim 1, wherein in the detector, each one of the at least one lighting element is an LED light.

5. The bill counter as claimed in claim 1, wherein in the detector, the sensor device is an infrared-rays sensor device, and has
   a first sensor element mounted on the circuit board; and
   a second sensor element disposed above the transparent board; a position of the first sensor element corresponding to a position of the second sensor element.

6. The bill counter as claimed in claim 1, wherein in the detector, the image capturing device has a CMOS image sensor and a lens.

7. The bill counter as claimed in claim 1, wherein the detector has multiple reflecting boards connected to each other into a loop.

8. The bill counter as claimed in claim 7, wherein in the detector, the circuit board, the reflecting boards, and the transparent board are connected to form an enclosed space.

9. The bill counter as claimed in claim 7, wherein the detector has four reflecting boards connected to each other into a rectangle.

10. The bill counter as claimed in claim 9, wherein the detector has four lighting elements arranged in a rectangle.

11. The bill counter as claimed in claim 1, wherein in the detector, the top surface of the circuit board is reflective.

12. The bill counter as claimed in claim 11, wherein in the detector, the top surface of the circuit board is a rough surface.

13. The bill counter as claimed in claim 1, wherein the detector is modularized and is detachably mounted between the side panels, the bill-in part and the bill-out part.

14. The bill counter as claimed in claim 13, wherein
   one of the side panels has a through hole formed through said one of the side panels; and
   the detector is mounted transversely in the through hole of said one of the side panels.

15. The bill counter as claimed in claim 1, wherein the wheel assembly has
   a first wheel mounted between the side panels, and disposed above a boundary between the bill-in part and the detector;
   a second wheel mounted between the side panels, and disposed above a boundary between the detector and the bill-out part; and
   a third wheel mounted between the side panels, and disposed above the bill-out part and between the second wheel and the bill-stacking device.

16. The bill counter as claimed in claim 15, wherein the wheel assembly further includes an auxiliary wheel mounted between the side panels, and disposed above the detector.

17. The bill counter as claimed in claim 16, wherein the sensor device is mounted between the auxiliary wheel and the second wheel.

* * * * *